No. 709,794. Patented Sept. 23, 1902.
W. C. PARMLEY.
CONCRETE ARCH CONSTRUCTION.
(Application filed Feb. 25, 1902.)
(No Model.)
4 Sheets—Sheet 1.

WITNESSES:
Walter C. Parmley INVENTOR.
BY
ATTORNEY.

No. 709,794. Patented Sept. 23, 1902.
W. C. PARMLEY.
CONCRETE ARCH CONSTRUCTION.
(Application filed Feb. 25, 1902.)
(No Model.) 4 Sheets—Sheet 2.

WITNESSES: Walter C. Parmley INVENTOR.
BY
ATTORNEY.

No. 709,794. Patented Sept. 23, 1902.
W. C. PARMLEY.
CONCRETE ARCH CONSTRUCTION.
(Application filed Feb. 25, 1902.)
(No Model.) 4 Sheets—Sheet 3.

WITNESSES: Walter C. Parmley INVENTOR.
BY
ATTORNEY.

No. 709,794. Patented Sept. 23, 1902.
W. C. PARMLEY.
CONCRETE ARCH CONSTRUCTION.
(Application filed Feb. 25, 1902.)
(No Model.)
4 Sheets—Sheet 4.

WITNESSES:
Brennan West
W.D. Browning

Walter C. Parmley INVENTOR.
BY
S. E. Foulds
ATTORNEY.

UNITED STATES PATENT OFFICE.

WALTER C. PARMLEY, OF CLEVELAND, OHIO.

CONCRETE ARCH CONSTRUCTION.

SPECIFICATION forming part of Letters Patent No. 709,794, dated September 23, 1902.

Application filed February 25, 1902. Serial No. 95,603. (No model.)

*To all whom it may concern:*

Be it known that I, WALTER C. PARMLEY, a citizen of the United States, residing at Cleveland, in the county of Cuyahoga and State of Ohio, have invented a new and useful Improvement in Concrete Arch Constructions, of which the following is a specification.

This invention relates in general to concrete arch construction, and has particular reference to certain new and useful combinations of metal bars, rods, shapes, &c., with the masonry or cement of the arch. It has been customary to insert in an arch bars, &c., which are so embedded therein as to resist more or less perfectly the bending moments produced laterally or in a plane transversely to the axis of the arch, such a structure being shown and described in my pending application, filed June 4, 1901, Serial No. 63,090. This structure while it may be made to meet all the requirements for uniform loading and also in cases where the various strains can be exactly calculated is not perfectly suited to arches when the loads are variable, and this is the condition almost uniformly met with in practice. In nearly all cases the loads are more or less irregularly applied to the arch structure, and hence they produce an irregularity in the positions and directions of the various thrusts and bending moments. Furthermore, it is practically impossible to build a concrete or masonry structure that is homogeneous throughout, there being planes and lines of weakness due to irregularities in the quality of the material or in the workmanship. In placing metal bars, &c., in a structure of this character it becomes important, therefore, to give due consideration to all these irregularities in the strains and in the materials and to so place the bars as to make the arch capable of withstanding all the strains to which it may be subjected.

Figure 1:
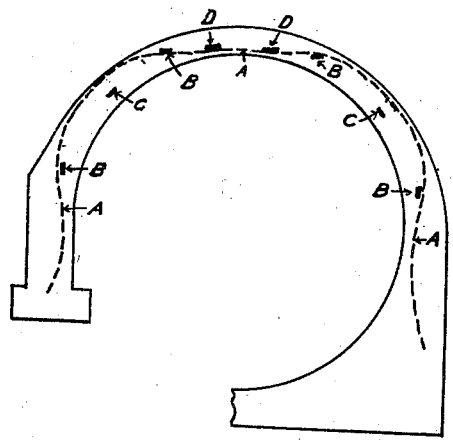
Figure 4:
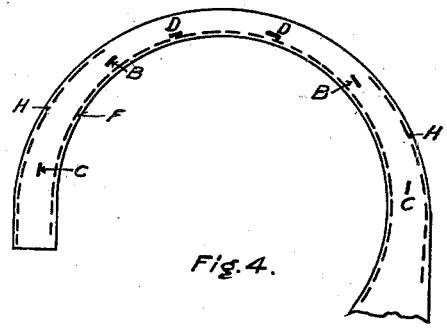
Figure 5:
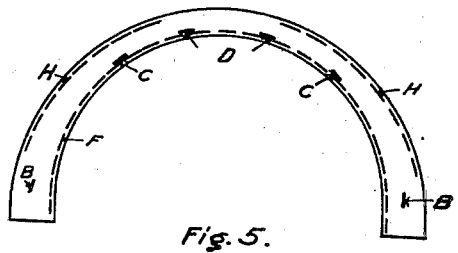
Figure 2:
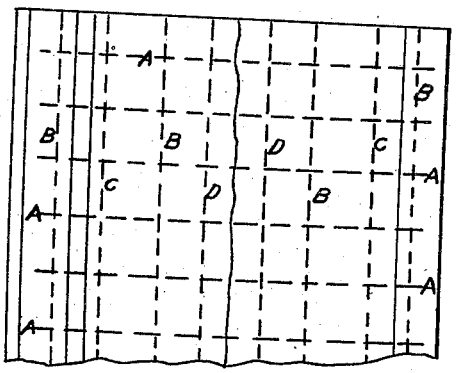
Figure 6:
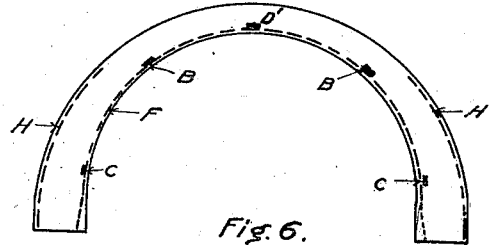
Figure 3:
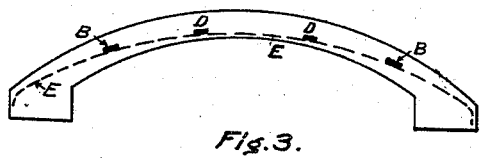
Figure 7:
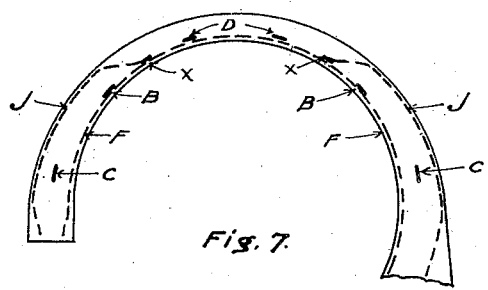
Figure 11:
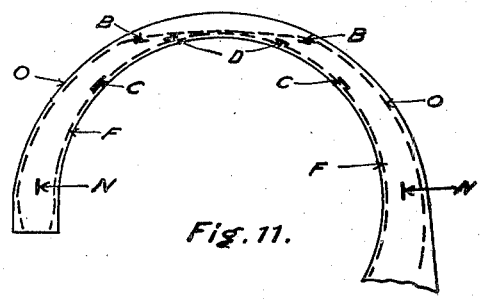
Figure 8:
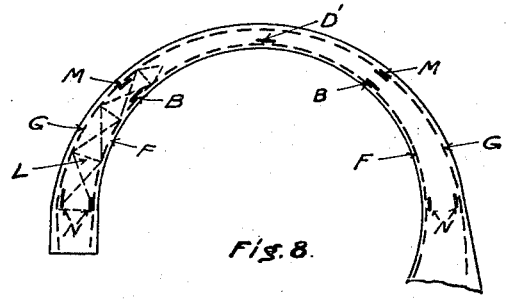
Figure 12:
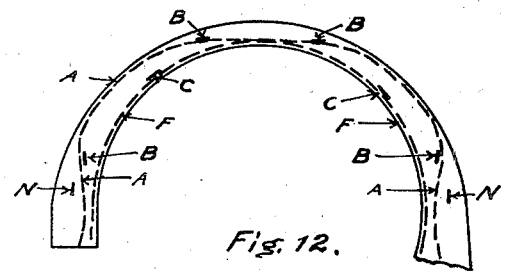
Figure 9:
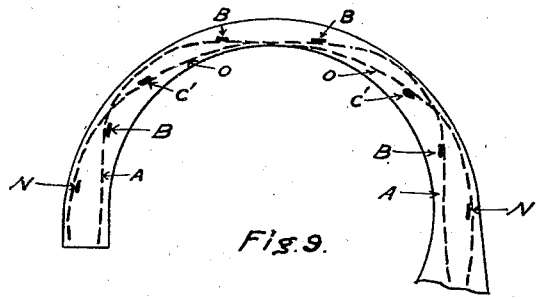
Figure 13:
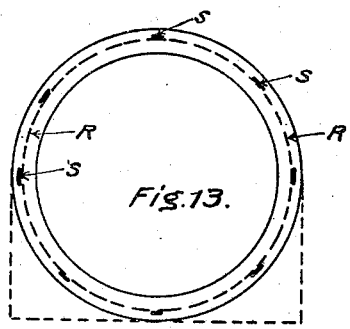
Figure 10:
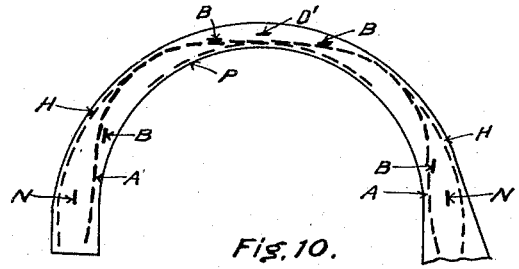
Figure 17:
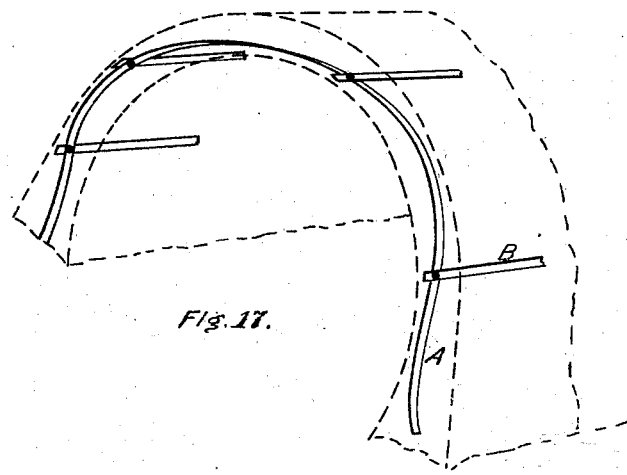
Figure 19:
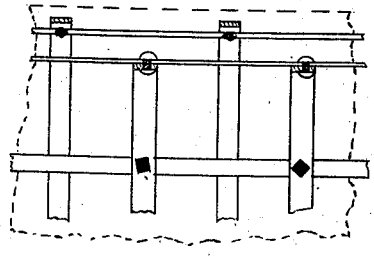
Figure 18:
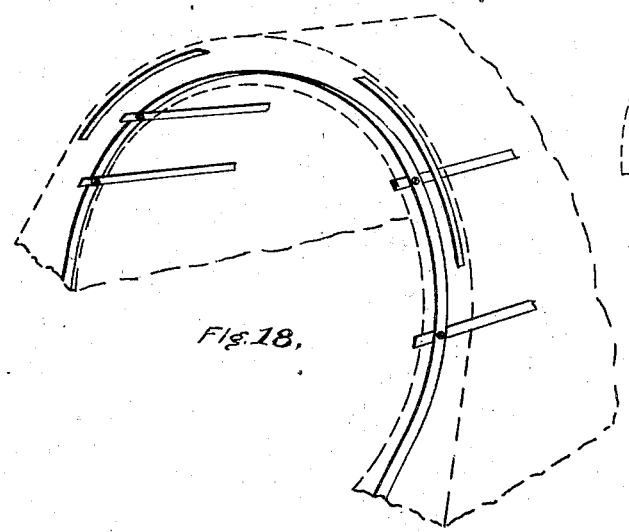
Figure 20:
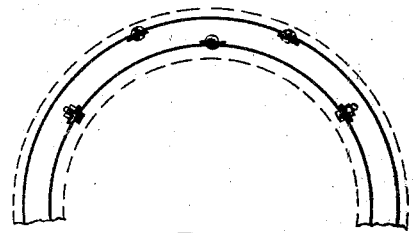

In the accompanying drawings, which illustrate my preferred forms of arrangement of the bars, &c., Figure 1 represents in sectional elevation, and Fig. 2 in plan, an arch in which transverse bars are passed through all the regions of tension in both the intrados and extrados and are combined with longitudinal bars extending parallel with the axis of the arch, some of said bars being placed at points intermediate the tensional regions and the others at different points. Fig. 3 shows in sectional elevation a segmental arch of less than a semicircle, the arrangement of the various bars being substantially the same as in the upper part of the arch shown in Figs. 1 and 2. Fig. 4 is a sectional elevation of an arch that has a continuous transverse bar passing along the intrados and shorter bars each passing through but one region of tension in the extrados, said bars being combined with other bars extending substantially parallel with the axis of the arch. Fig. 5 is a sectional elevation of an arch similar to that shown in Fig. 4, but having a somewhat-different arrangement of the longitudinal bars. Fig. 6 shows an arch similar to that illustrated in Figs. 4 and 5. Fig. 7 is a sectional elevation of a form of arch that has continuous bars passing through the intrados and other bars connected therewith at suitable points and passing through the arch to the extrados, all of said bars extending into the abutments and being combined with longitudinal bars. Fig. 8 shows a form of arch that has continuous bars passing around in both the intrados and extrados, said bars being connected through the arch by a web system and being combined with longitudinal bars. Fig. 9 is a sectional elevation of an arch having bars that pass continuously through all the regions of tension in both intrados and extrados and other transverse bars that pass through the tensional regions near the base of the extrados and then through the tensional region in the intrados at the crown, said bars being in combination with the longitudinal bars. Fig. 10 illustrates an arch that has continuous bars passing through all the regions of tension in the intrados and extrados and other transverse bars reinforcing the continuous bars at the crown and also at the abutments, said bars being in combination with the longitudinal bars. Fig. 11 shows a form of arch having bars passing continuously through the intrados and other bars passing continuously from the extrados at the abutments through the arch and through the region of tension in the intrados at the crown, said bars, as before, being combined with those extending parallel with the axis of the arch. Fig. 12 is a sectional view of an arch similar to that shown in Fig. 9 except that the bar, which in that figure extended into the extrados at or near the abutments, is carried continuously through the intrados. Fig. 13 shows a transverse and Fig. 14 a longitudinal section through a form of tubular arch in which a continuous transverse bar is placed spirally about the tube within the concrete substantially midway between the intrados and extrados. With this bar are combined a plurality of longitudinal bars, as shown. Fig. 15 is a transverse, Fig. 16 a longitudinal, section of a form of arch similar to that shown in Figs. 14 and 15, but having two continuous bars passing spirally about within the concrete, one of the spirals being arranged within the other and both being combined with longitudinal bars. Preferably one bar is wound into a right-hand and the other into a left-hand spiral, as shown. Fig. 17 is a perspective view of the form of arch shown in Fig. 1, illustrating the connections between the transverse and longitudinal bars. Fig. 18 is a similar view of the form shown in Figs. 4, 5, &c. Fig. 19 is a longitudinal section through the arch, showing the transverse and longitudinal bars connected at points intermediate the tensional regions; and Fig. 20 is a transverse section of the same.

Similar reference characters designate corresponding parts throughout the several views of the drawings.

As stated, the conditions met with in actual practice render it impossible to calculate to a certainty the thrusts and stresses to which an arch structure will be subjected. This is due to a number of facts, such as moving loads, irregularities in material and workmanship, differences in the character of the abutments, and unequal settling of the ground about the arch. It thus becomes necessary to form the arch structure in such a way that it will withstand all the stresses to which it may be subjected at any point. In general I accomplish this result by inserting longitudinal bars, rods, or shapes transversely to the main tension rods, bars, or shapes or in the direction of the axis of the arch and by securing the two systems of bars together at their points of intersection or not, as may be desirable in the particular case. In an arch not reinforced by a system of longitudinal bars the structure immediately underneath a concentrated or excessive load will be subjected to greater strains than the remaining portions of the arch, and undue deflection, cracking, or, in extreme cases, failure may result. When the longitudinal bars are inserted, however, they distribute the excessive strains over a greater portion of the arch and to a greater number of main supporting-bars, thereby greatly increasing the strength of the arch. It will be understood that the number of both transverse and longitudinal bars and also the disposition of the same must vary with the particular conditions that are present, and that in a long arch, as a sewer, when the loads and the embedding earth vary in character, the bars will be added and disposed so as to withstand the strains at all points, being most numerous at the points of possible emergency.

In Figs. 1 and 2, A A represent the main transverse bars, which pass continuously from the intrados near the abutments through the neutral regions to the extrados and again through the arch to the intrados at the crown. These bars thus pass through all the regions of tension in both intrados and extrados. Combined with these bars are longitudinal bars B B, which are embedded in the arch between these regions of tension, bars C C, which are placed opposite the points of tension in the extrados, and bars D D, which occupy positions on each side of the arch near the crown and preferably in the region of tension in the intrados. The bars B B are or are not connected with the transverse bars A, as may be preferred. This form of arch is very economical owing to the small amount of metal present, and is a very good form to employ where the load is applied at the crown. Fig. 3 shows a segmental arch having the same arrangement of bars as is shown in the upper part of Fig. 1 and being useful under the same or similar conditions. In this figure but a part of the transverse bars A appear, and these are designated E.

At this point it may be stated that inasmuch as the longitudinal bars run parallel with the axis and with one another it is not deemed necessary to multiply the drawings by showing plan views of each form, as such views would differ from Fig. 3 only in the location of the longitudinal bars, and the locations of these parts are shown in the sectional views. The first form thus described would be poorly adapted to sustain a concentrated load applied at points midway between the crown and the abutments or opposite the bars C owing to the fact that there would be no transverse bar in the region of greatest tension, said bar being at that point in the extrados and in the region of compression. When such loads are or may be applied or when it is impossible to foresee and calculate the strains in the arch, it is preferable to adopt the form shown in Fig. 8, in which continuous bars F and G pass through the intrados and extrados, respectively, or the forms shown in Figs. 4, 5, and 6, which may be regarded as modifications of the form shown in said Fig. 8, requiring less material, and hence preferable under certain conditions. In each of these forms the bars F pass continuously through the intrados, as in Fig. 8; but instead of having continuous bars in the extrados, as in that figure, I use short bars H, each of which pass through a region of tension and far enough beyond the same to secure firm anchorage.

Fig. 5 shows a somewhat-different location for the bars H from that shown in Figs. 4 and 6, as the bars are placed in the regions of tension the locations of which vary with the loads. It will be understood that instead of having the continuous bars in the intrados and the shorter bars in the extrados, as shown, the positions of these bars may be reversed, thus placing the continuous bars in the extrados. Combined with the transverse bars F and H, as shown in Figs. 4 and 5, are the longitudinal bars D D, which, as in the forms heretofore described, are embedded in the intrados on opposite sides near the crown, the bars C C, which are placed opposite the regions of tension in the extrados, and the bars B, which are located intermediate the regions of tension. In the form shown in Fig. 6 the bars D are omitted, and a single bar D' is employed at the crown in the intrados. In these forms the bars B, C, and D may be secured to the bars F if desired, thereby making a complete system of connected lateral and longitudinal bars. The bars H, however, are not connected with the other bars, but are embedded in the concrete at the regions of tension in the extrados. In certain cases of arch construction this would be the preferred arrangement.

In Fig. 7 the bars F extend continuously along the intrados, or if the extrados should be subjected to the greater number of tensional strains the bars G, as shown in Fig. 8, would be employed instead. Connected to the bars F in a suitable manner at the points x, intermediate between tensional regions, are bars J, which pass through the body of the arch and along the opposite side through the region subjected to tension. This is a valuable arrangement of transverse bars in cases of arches having insufficient stability of abutment against the thrust of the arch laterally, for the strains in bars J are opposed and neutralized through their connection with bars F near the crown of the arch. Combined with these bars are the longitudinal bars D and C, which, as in the forms heretofore described, lie in the intrados on opposite sides of the crown and opposite the regions of tension in the extrados, respectively. These bars may or may not be connected with the bars F. In addition to these bars are other longitudinal bars B, which are inserted to help distribute an unequal loading over a greater length of arch. The bars B are located between the tensional regions in the intrados and are preferably connected with the bars F.

Fig. 8 will serve to illustrate several different combinations of transverse and longitudinal bars. In order to provide for all possible distributions of loading, I may pass bars F and G continuously around the intrados and extrados of the arch in the same vertical plane, and for the purpose of further assisting the concrete in transferring the strains from the crown to the abutments I may, if found desirable, connect the bars by a web system, as shown at L. Combined with these bars is a longitudinal bar D', as shown in Fig. 6, the bars B B intermediate points of tension, the bars M M in the extrados opposite the bars B, and the bars N in both intrados and extrados at the abutments. The longitudinal bars may or may not be connected with the transverse bars, as preferred. Bars F and G may also be alternated by placing the bars G over the spaces between bars F. In this case the web system L is omitted or is made by passing bars diagonally upward and downward from one set of bars to the other. By these combinations all possible irregularities and changes in the loading are provided for and distributed to the greatest possible length of arch for support.

In the forms of arches shown in both Figs. 9 and 10 the serpentine bars A (shown in Fig. 1) are employed. In the first arch these bars are combined with bars O, that pass from the extrados at the abutments upwardly and inwardly to the intrados at the crown, thus extending through but one region of tension in the intrados, while the bar A for the same disposition of load will pass through all the regions of tension in both intrados and extrados. Bar A is normally in tension for uniform vertical loads when the abutments are rigid; but bar O affords a tensional support when there are unequal loads or where there is not sufficient strength or rigidity laterally or vertically in the abutments. Combined with bars A and O are the longitudinal bars B described in connection with the arch shown in Fig. 1 and the bars N used in the extrados of the arch shown in Fig. 8. Bars C' almost opposite the region of tension in the extrados are also employed, said bars corresponding to bars C in Fig. 1. The transverse and longitudinal bars may be secured together at their points of intersection, if preferred. This arch possesses a very great strength in proportion to the amount of metal employed. Bars A and O may alternate, or a greater number of one kind than the other may be used to meet the conditions for any particular case.

Fig. 10 shows a form that is similar to that just described and which is adapted to meet the same general requirements. Instead, however, of having continuous bars O passing through a tensional region in the extrados and then through the arch into the intrados I employ a plurality of bars H, as shown in Figs. 4, 5, and 6, in the extrados near the abutments, said bars extending through the tensional regions there and far enough beyond to secure anchorage. These bars assist in sustaining the strains from unequal loading, from yielding abutments, or from insufficient lateral supports. While the bars A are intended to sustain the principal tensional loads, I reinforce them at the crown by placing bars P in the intrados, said bars passing through the region of tension and some distance beyond. Bars H and P may be placed in alternation with bars A or directly opposite the same, as desired, and they may be inserted as frequently as is deemed necessary to support the load on the arch. This arrangement of bars is adapted for cases where the dead-load varies along different portions of the arch, for a sufficient number of bars A may be inserted to provide for the normal or minimum strains and the arch strengthened where necessary by the addition of the desired number of bars H and P. Combined with the bars A, H, and P are longitudinal bars B, D', and N, arranged, as heretofore described, in positions intermediate the tensional regions, at the crown, and near the base in the extrados, respectively. The longitudinal bars are or are not connected with the transverse bars, as may be found most suitable to meet the requirements of the particular case.

In the form shown in Fig. 11 I employ the bars F and O, the former being shown in Figs. 4 5 6, &c., and the latter in Fig. 9, said bars having the functions and advantages stated in the description of the forms shown in these figures. Combined with these bars are the longitudinal bars D, arranged as heretofore described, B occupying positions intermediate the tensional regions and C, which are placed opposite the tensional region, in the extrados. There are also longitudinal bars which are placed in the intrados some distance below the bars B and which assist in transferring the strains from concentrated loads applied in their regions to the adjacent transverse bars F and O. The longitudinal and transverse bars may be connected together, if thought desirable.

Fig. 12 shows a form of arch having the bars A and F combined with the longitudinal bars B, C, and N, heretofore described. In each of the forms shown in Figs. 9, 10, 11, and 12 the two sets of transverse bars may be secured together at the crown, if desired.

Figure 14:
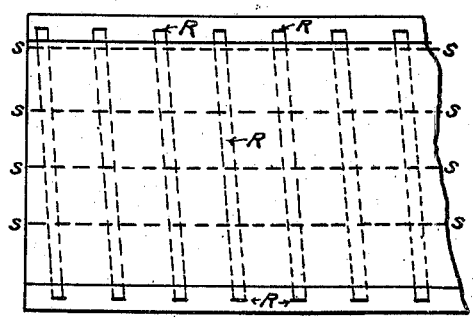
Figure 15:
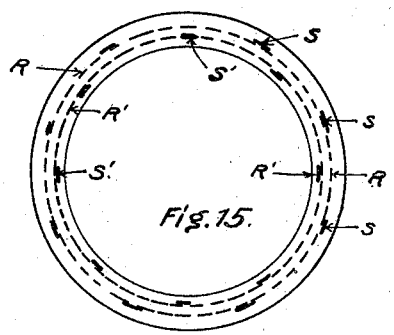

Figs. 13 and 14 show a form of tubular arch in which a continuous bar R is passed spirally around and around within the structure, preferably near the plane midway between the intrados and extrados. Combined with this bar are longitudinal bars S, which give rigidity and strength to the structure and distribute strains due to concentrated loads over a greater number of convolutions of the bar R. As will be understood, the tubular arches may be circular, elliptical, oval, or any other suitable shape in cross-section.

Figure 16:
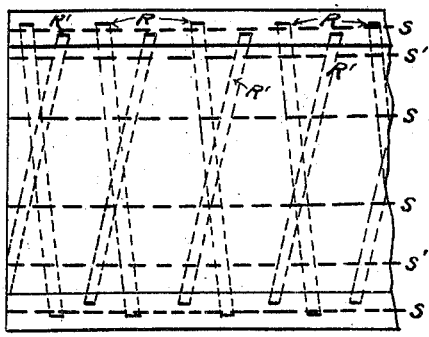

In Figs. 15 and 16 another form of tubular arch is shown, in which two continuous bars R and R' are employed, the bar R' being within and being wound in the opposite direction to the bar R. Combined with these bars are longitudinal bars S and S', which lie next the bars R and R', respectively, and may or may not be connected thereto, as seems most desirable. Instead of having the extrados and intrados lines parallel, as shown, the former may be developed into other forms, such as that shown in Fig. 1. In the forms shown in Figs. 13 to 16 a series of closed rings arranged transverse to the axis may be substituted for the spiral bars, if desired.

Throughout the specification and claims the term "bar" is used in a generic sense and is intended to include all forms of plain, corrugated, or other shaped bars, angles, &c., or all forms of built-up sections of bars held together by means of rivets, bolts, or otherwise, so as to form a continuation of the metal member. The term "concrete" is used to cover mortar or mortar in combination with broken stone, gravel, and the like, or it may also include brick or stone masonry laid in mortar.

Having thus described my invention, what I claim as new, and desire to secure by Letters Patent, is—

1. In a concrete arch, the combination of bars transverse to the axis of the arch and passing through regions of tension in both intrados and extrados, and other bars extending longitudinally with the axis of the arch.

2. In a concrete arch, the combination of bars transverse to the axis of the arch and passing continuously through all the regions of tension in intrados or extrados of the arch, other transverse bars passing through regions of tension in both intrados and extrados of the arch, and longitudinal bars extending in the direction of the axis, substantially as described.

3. In a concrete arch, the combination of bars transverse to the axis and passing continuously through all the regions of tension in one side of the arch, other transverse bars in one of the sides of the arch and passing through part only of that side, and longitudinal bars extending in the direction of the axis.

4. In a concrete arch, the combination of bars transverse to the axis of the arch and passing continuously through all the regions of tension in one side thereof, other transverse bars in one of the sides of the arch and passing through part only of that side, and longitudinal bars attached to the transverse bars at points intermediate the tensional regions.

5. In a concrete arch, the combination of bars transverse to the axis of the arch and each passing continuously through regions of tension in both intrados and extrados, and other bars extending longitudinally with the axis of the arch, said longitudinal bars being attached to the transverse bars at points intermediate between the intrados and extrados tensional regions.

6. In a concrete arch, the combination of bars transverse to the axis of the arch in both intrados and extrados, the bars on one side extending continuously through all the regions of tension on that side, and those on the other side extending through a single tensional region and far enough beyond to give secure anchorage, and longitudinal bars attached to the continuous tensional bars, substantially as described.

7. In a concrete arch, the combination of bars transverse to the axis of the arch and extending continuously through all the regions of tension in one side of the arch, other transverse bars attached thereto and passing through the body of the arch and into the other side where they pass through a single tensional region, and longitudinal bars extending in the direction of the axis of the arch.

8. In a concrete arch, the combination of bars transverse to the axis of the arch in the intrados thereof, and other bars in the extrados thereof, the bars in the extrados being opposite the spaces between those in the intrados, with other bars extending in the direction of the axis of the arch, substantially as described.

9. In a concrete arch, the combination of bars transverse to the axis of the arch in the intrados thereof, and other bars in the extrados thereof, the bars in the extrados being opposite the spaces between those in the intrados, with longitudinal bars attached to the transverse bars in intrados or extrados at points intermediate the tensional regions, substantially as described.

10. In a concrete arch, the combination of bars transverse to the axis of the arch and passing continuously through all the regions of tension in both intrados and extrados, other transverse bars passing through part only of the tensional regions and far enough beyond to give secure anchorage, and longitudinal bars extending in the direction of the axis.

11. In a concrete arch, the combination of bars transverse to the axis of the arch and passing continuously through all the regions of tension in both intrados and extrados, with longitudinal bars extending in the direction of the axis.

12. In a concrete arch, the combination of bars transverse to the axis of the arch and passing continuously through all the regions of tension in both intrados and extrados, with longitudinal bars extending in the direction of the axis and being attached to the transverse bars at points intermediate the tensional regions, substantially as described.

13. In a concrete arch, the combination of bars tranverse to the axis of the arch and passing continuously through regions of tension in both intrados and extrados, and other bars extending longitudinally with the axis of the arch, substantially as described.

14. In a concrete arch, the combination of bars transverse to the axis of the arch and extending continuously through all the regions of tension in one side of the arch, other transverse bars attached thereto and passing through the body of the arch and into the other side, and longitudinal bars extending in the direction of the axis.

In testimony whereof I affix my signature in the presence of two witnesses.

WALTER C. PARMLEY.

Witnesses:
S. E. FOULSZ,
JAMES T. HARDING.